(12) United States Patent
Bettancini

(10) Patent No.: US 10,301,498 B2
(45) Date of Patent: May 28, 2019

(54) WRITING INSTRUMENT AND RELATED PRODUCTION METHOD

(71) Applicant: SIGNATURE S.R.L., Ravenna (IT)

(72) Inventor: Andrea Bettancini, Ravenna (IT)

(73) Assignee: SIGNATURE S.R.L., Ravenna (IT)

( * ) Notice: Subject to any disclaimer, the term of this patent is extended or adjusted under 35 U.S.C. 154(b) by 0 days.

(21) Appl. No.: 15/961,397

(22) Filed: Apr. 24, 2018

(65) Prior Publication Data

US 2018/0237652 A1    Aug. 23, 2018

Related U.S. Application Data

(63) Continuation of application No. PCT/IB2016/056382, filed on Oct. 24, 2016.

(30) Foreign Application Priority Data

Oct. 26, 2015    (IT) ............... UB2015A005101

(51) Int. Cl.
| | |
|---|---|
| *B43K 1/00* | (2006.01) |
| *B43K 15/00* | (2006.01) |
| *C22C 12/00* | (2006.01) |
| *C09D 13/00* | (2006.01) |
| *C22C 13/02* | (2006.01) |
| *B43K 19/04* | (2006.01) |
| *B43K 21/08* | (2006.01) |

(52) U.S. Cl.
CPC ............... *C09D 13/00* (2013.01); *B43K 1/00* (2013.01); *B43K 15/00* (2013.01); *B43K 19/04* (2013.01); *B43K 21/08* (2013.01); *C22C 12/00* (2013.01); *C22C 13/02* (2013.01)

(58) Field of Classification Search
CPC ......... C09D 13/00; C22C 12/00; C22C 13/00; C22C 13/02; B43K 1/00; B43K 15/00; B43K 19/00; B43K 19/04; B43K 19/06; B43K 19/08
See application file for complete search history.

(56) References Cited

U.S. PATENT DOCUMENTS

| | | |
|---|---|---|
| 2,891,511 A | 6/1959 | Reinhard |
| 3,435,528 A | 4/1969 | Ferchland |
| 2010/0055467 A1* | 3/2010 | Kulfan ............... C08G 18/428 428/412 |
| 2012/0160539 A1 | 6/2012 | Nonaka |

\* cited by examiner

*Primary Examiner* — David J Walczak
(74) *Attorney, Agent, or Firm* — Abelman, Frayne & Schwab

(57) ABSTRACT

Writing instrument (1) comprising a writing element (20) having a body (21) delimited by an end (22) coated with a metal material suitable to trace signs on paper through oxidation, and method for producing the writing element (20).

14 Claims, 2 Drawing Sheets

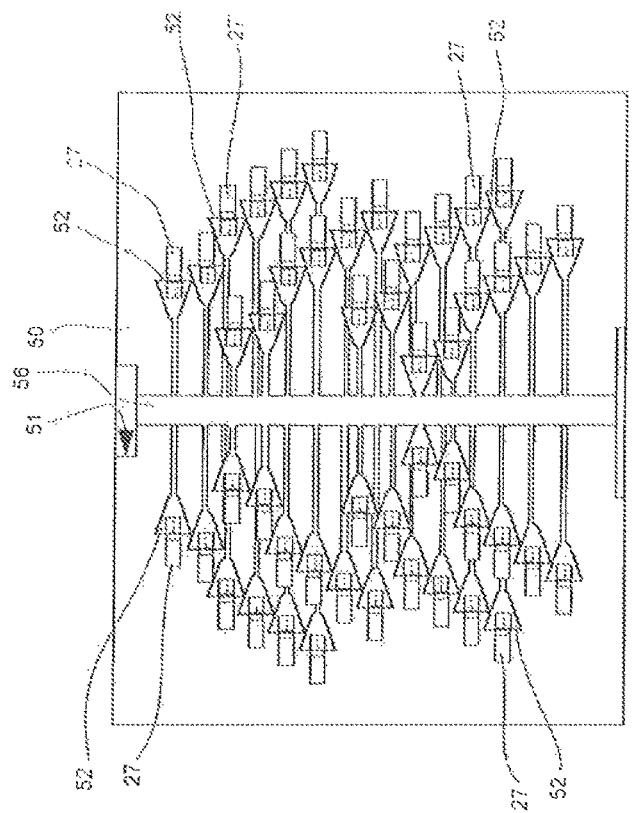
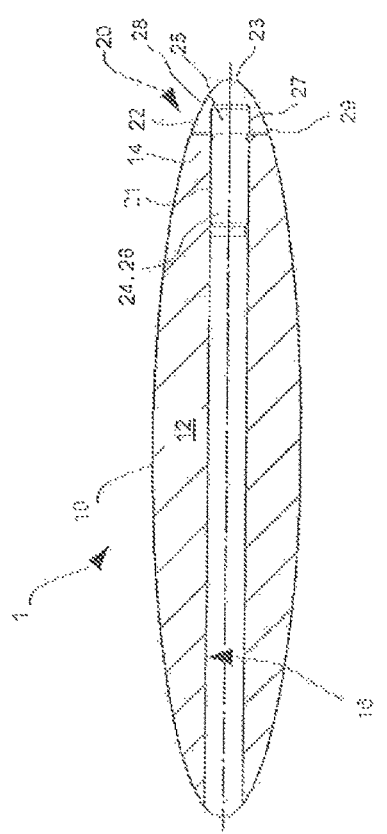
Fig. 2
Fig. 1

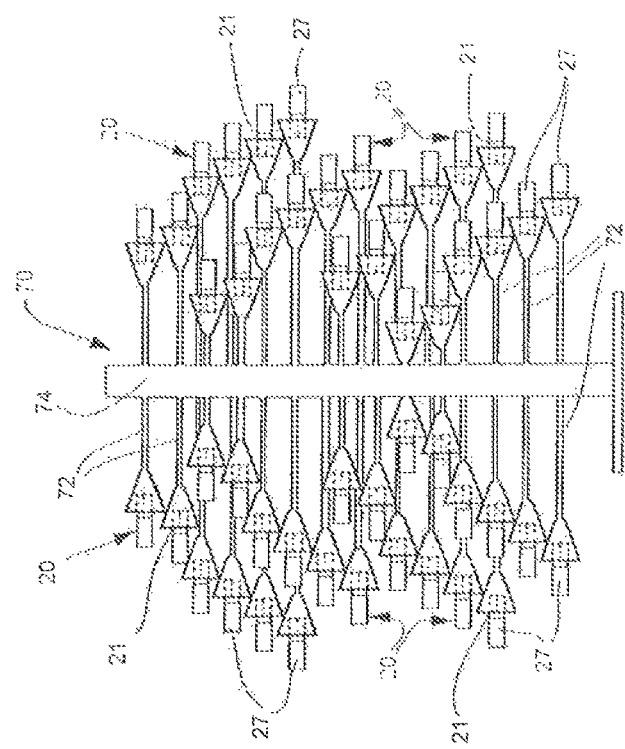
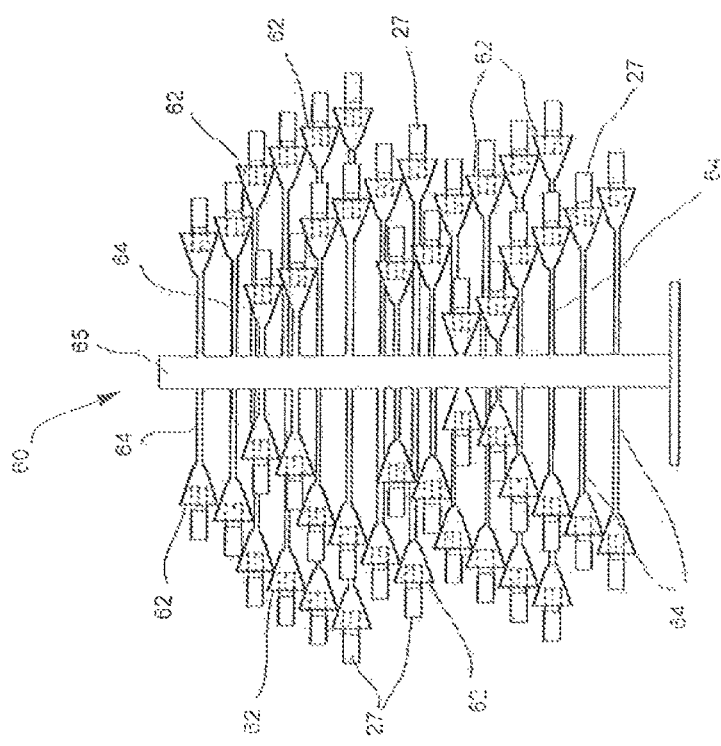

WRITING INSTRUMENT AND RELATED PRODUCTION METHOD

RELATED APPLICATIONS

This application is a continuation application of International Application PCT/IB2016/056382 filed Oct. 24, 2016 and designating the U.S. and which claims priority of Italian application UB2015A005101 filed Oct. 26, 2015, both applications are incorporated herein by reference thereto.

BACKGROUND OF THE INVENTION

1. Field of the Invention

The present invention relates to a writing instrument. In particular, the present invention relates to a writing instrument comprising an elongated support and a terminal usable for writing on paper. In more detail, the present invention relates to a writing instrument comprising an elongated support and a terminal usable for dry writing on paper.

2. Description of the Prior Art

In the field of writing instruments and drawing tools the use is well known of materials that leave traces on paper when rubbed on it with enough force to win the drag force, knowingly proportioned to the friction coefficient. One of the most known materials for tracing signs on paper is graphite, that, for a long time, has replaced materials like coal and hematite, an iron oxide. Graphite comprises clay in different percentages according to the desired hardness degree. Graphite is generally used to produce the so-called leads used for manufacturing pencils, of which they are the core, or to produce lead refills for drafting pencils, that are writing instruments provided with a leads reservoir tube and with a step-motion device that moves each lead forwards in order to allow writing or drawing.

One of the inconveniences of writing or drawing using graphite leads is that the graphite easily crumbles due to friction when rubbed on paper; for this reason the lead point shall be often sharpened if you do not want to write/draw with a point having the same dimension as the lead diameter, this resulting in a fast consumption of the lead and a limited overall length of the signs that can be traced. Moreover, the micro-powder associated with the trace left on the paper by means of a graphite lead can be expanded, and therefore modified, simply by passing a finger on the trace, with the risk of making illegible what has been drawn or written. The process for tracing signs on paper using hematite or lead-based alloys or silver-based alloys is different. This artistic technique has been known from the Middle Age, when graphite had not yet been discovered and, for drawing, artists used a stylus with a tip made of silver other metals. The process behind this technique is the oxidation caused by the friction of the metal on the paper that generates a change in the color of the portion in contact with the metal. The change in color depends on the local alteration of the paper polymer chain. These metals and alloys have therefore the advantage of being usable to make substantially permanent signs on paper. In view of the above description, and in particular due to the different mechanism used for marking paper, the points made of metal alloy remain sharpened significantly longer than the points of the graphite leads, i.e. they require to be only seldom sharpened. The points made of these metal materials are therefore more durable and, finally less expensive, the length of signs they can trace being equal to that of graphite leads.

On the other hand, silver costs significantly more than graphite, and the signs it traces are visibly marked only if a particular type of paper is used; furthermore, lead is a highly toxic metal, whose use is substantially prohibited for daily use.

In view of the above description, the problem of using a harmful metal alloy for writing through paper oxidation, instead of a graphite micro-powder that is substantially harmless to the user, is currently unsolved, and represents an interesting challenge for the Applicant, aiming at modifying at own advantage the market of writing instruments.

In view of the situation described above it would be desirable to have available writing instruments using writing elements made of an alloy that, in addition to allow limiting and possibly overcoming the drawbacks of the prior art, is harmless to the user, thus defining a new standard for the writing elements, is durable, easy to be maintained, and so light as to require minimal transport costs and therefore minimal recovery costs.

SUMMARY OF THE PRESENT INVENTION

The present invention relates to a writing instrument. In particular, the present invention relates to a writing instrument comprising an elongated support and a terminal usable for writing on paper. In more detail, the present invention relates to a writing instrument comprising an elongated support and a terminal usable for dry writing on paper, and to the related production method.

An object of the present invention is to provide a writing element that is made of metal material, is suitable to trace signs on paper through oxidation of the latter, and is usable in combination with a writing instrument suitable to solve the above mentioned drawbacks and to satisfy a plurality of requirements that to date have still not been addressed, and therefore suitable to represent a new and original source of economic interest for the Applicant.

According to the present invention a writing element made of metal material is provided, whose main features will be described in at least one of the appended claims.

A further object of the invention is to provide a writing instrument that integrates said writing element, allows to solve the above mentioned drawbacks, and is suitable to satisfy a plurality of requirements that to date have still not been addressed, and therefore suitable to represent a new and original source of economic interest for the Applicant.

According to the present invention a writing instrument is provided, whose main features will be described in at least one of the appended claims.

A further object of the present invention is to provide a method for constructing a writing element that is made of metal material and is suitable to trace signs on paper through oxidation of the latter.

According to the present invention a method is provided for constructing said writing instrument, whose main features will be described in at least one of the appended claims.

A further object of the present invention is to provide a metal alloy that is usable to produce a writing element suitable to trace signs on paper through oxidation of the latter.

According to the present invention a metal alloy is provided for producing a writing element that is suitable to trace signs on paper through oxidation of the latter, whose main features will be described in at least one of the appended claims.

BRIEF DESCRIPTION OF DRAWINGS

Further characteristics and advantages of the writing element, the writing instrument and the production method of said writing element according to the present invention will be more apparent from the description below, set forth with reference to the attached drawings, that illustrate some examples of embodiment, where identical or corresponding parts of the equipment are identified by the same reference numbers. In particular:

FIG. 1 is a longitudinal cross-section of a writing instrument provided with a writing element according to the present invention;

FIG. 2 is a schematic longitudinal cross-section of a mould according to the present invention;

FIG. 3 is a schematic side elevation view of a core usable for realizing FIG. 2; and FIG. 4 is a schematic side elevation view of a bunch-shaped structure that can be produced by using the mould of FIG. 2.

DETAILED DESCRIPTION OF THE PRESENT INVENTION

In FIG. 1, number 1 indicates, in its entirety, a writing instrument comprising an elongated member/stem 10 having a longitudinal cavity 16 of given extension suitable to house a writing element 20 in a stable and selectively releasable way. Externally, the stem 10 has an elongated grip portion 12 that is longitudinally delimited by an end portion 14, is shaped in a given manner and can be used to handle the instrument 1 and, thus, to write and to draw or to perform maintenance of the writing element. For the sake of practicality, in FIG. 1 the grip portion 12 has been illustrated like a perfecto-shaped cigar, whose body is similar to a very elongated oval and whose respective ends are closed, without however limiting the general scope of the present invention.

The writing element 20 has a body 21 having an elongated portion 24 that is provided with a connecting member 26 suitable to engage the cavity 16 at the side of the end portion 14. With reference to FIG. 1 again, the connecting member 26 associated with the elongated portion 24 comprises a threaded stalk (below simply "stalk 26"). The body 21 is delimited, at opposite side from the threaded stalk 26, by an end 22 coated with a cover 28 made of metal material and having a point (or terminal) 23. The stalk 26 is part of a screw 27 engaging a cavity of the end 22 with a support portion 25 in a rigid integral manner. The screw 27 is made of steel or of a metal material with mechanical features similar to those of steel. Obviously, the end portion 14 is threaded in order to couple to the screw 27 in a stable and selectively releasable manner for the replacement and/or maintenance of the writing element 20.

With particular reference to FIG. 1 again, the point/terminal 23 has a first portion 29 that is substantially conical starting from its base diameter and is into contact, in use, with the end portion 14 of the stem 10 of greater diameter, and the terminal 23 has a round shape, substantially a hemispherical shape, without however limiting the general scope of the present invention. In fact, the end 22 may have a substantially conical shape, wherein the terminal 23 is pointed, analogously to the classical shape of the sharpened pencils, as shown in FIG. 4.

The metal material of the cover 28 includes a bi-component metal alloy comprising bismuth and tin in given concentrations. Bismuth, even if having mechanical and chemical features similar to those of lead, does not have the dangerous effects the lead has on human body and, once it has been combined fused with tin in order to form the alloy of the cover 28, it causes the oxidation of the paper where the alloy is rubbed, leaving on the paper a sign of thickness equal to that of the point 23 that has traced it.

In particular, the bismuth concentration in the alloy is comprised between 60% and 80%, and the tin concentration is comprised between 40% and 20%. The Applicant has found that an alloy with 77% bismuth and 23% tin combines an optimal ability of oxidizing paper and a particular hardness of the terminal 23 that limits the wear thereof and, therefore, maximizes the duration of the writing element 20.

In view of what described above, it is possible to state that the end 22 of the writing element 20 is made of a composite material. In fact, the metal coating thereof is formed on a metal core of heterogeneous type with respect to that of the bi-component alloy used to produce the cover 28.

On the other hand, the present invention is embodied according to what described above even if the connecting member 26 engages, in a snap or bayonet way, the cavity 16 at the side of the end portion 14 of the stem 10.

The use of the writing element 20 and of the writing instrument 1 comprising it can be easily understood from the description above and does not require further explanations.

However, the particular construction of the writing element 20 is worth of some more details, contributing to better define the scope of the present invention.

In fact, the embodiments of the writing element 20 described above and illustrated in FIG. 1 may be realized by means of a production method based on the use of a forming process, pouring the metal alloy described above inside a mould 50 having a bunch-shaped cavity 51 provided with a plurality of alveoli 52 in aerial communication with one another through a hollow central portion 56 acting as a tank for the fused alloy, in order to supply fused material making up the shrinkage due to the cooling of the alloy in the alveoli 52.

According to the production method, the mould 50 has been previously produced, using gypsum or a material (hydraulic binder) with the same physical chemical features as gypsum if mixed with water, through forming in a cylindrical form, inside which a bunch-shaped core 60 has been previously inserted. The core 60 is made of wax and has a plurality of appendices 62 arranged at the end of branches 64 connected to a central element 65. Each appendix 62 is shaped reversely identical to each writing element 20, is provided with a screw 27 and is dimensioned taking into account the shrinkage of the hydraulic binder used. Once the wax of the core 60 has been eliminated from the mould 50, the alveoli 52 of the mould 50 are in aerial communication with one another through the central portion 56 of the mould 50, and each screw 27 remains engaging the corresponding alveolus 52. When the mould 50 is ready, the method provides for a step of melting a first given metal, for instance, although without limitation, bismuth; a step of melting a second given metal, for instance, although without limitation, tin, wherein this step can be performed at the same time, before or after the step of bismuth melting; a step of mixing bismuth and tin according to given proportions in order to originate the liquid bi-component alloy; a step of pouring the liquid alloy inside the mould in order to originate as many bodies 21 as many alveoli of the mould, each body being provided with an end 22 provided with the respective terminal 23. At this point, the method provides for a step of cooling the mould 5 containing the fused alloy in order to solidify it and create a bunch-shaped body 70, shaped similarly to the core 60 and provided with a support column 74 and with a plurality of branches 72, each of which starts from the column 74 and is delimited by a body 21 with the respective screw 27. The cooling step is followed by a subsequent step of crushing the mould 50 to extract the bunch-shaped body 70.

At this point it is clearly apparent that it is necessary to perform a step of separating each body 21 from the respective branch 72, and then processing the stalks 26 to make them suitable to stably connect, in a screw-like manner, the writing element 20 with a stem 10, and lathing and/or polishing the cover 28 so that the terminal 23 of each body 21 is adequately sharpened and ready for tracing signs on paper through oxidation, whose thickness can be defined at will.

In view of the above description, it is clearly apparent that each single writing element 20 can be produced by means of the method described above to equip the stem 10 with a writing instrument 1, can be used with substantially continuous effectiveness for long times, and is easy to be replaced at low costs and in reduced times, thus achieving all the objects of the present invention.

What is claimed is:

1. Writing element (20) for a writing instrument (1) comprising an elongated stem (10) having a grip portion (12) longitudinally delimited by an end portion (14); said stem (10) having a longitudinal cavity (16) of given extension; said writing element (20) having a body (21) delimited by an end (22) provided with a point (23) suitable, in use, to draw signs on paper through oxidation; said body (21) having an elongated coupling portion (24) provided with respective connecting means (26) suitable to engage said cavity (16); characterized in that said end (22) is covered by a cover (28) comprising said point (23) and is made of a composite metal alloy suitable to trace signs on paper through oxidation of the composite metal alloy.

2. Element according to claim 1, characterized in that said composite metal alloy is a bi-component metal alloy comprising a bismuth concentration of between 60% and 80%, and a tin concentration of between 40% and 20%.

3. Element according to claim 2, characterized in that said first component metal alloy comprises bismuth with concentration of 77% and said second component alloy metal comprises tin with concentration of 23%.

4. Element according to claim 1, characterized in that said connecting means (26) are suitable to engage said cavity (16) in a screw-like manner.

5. Element according to claim 4, characterized in that said end (22) is hollow inside, and in that said connecting means (26) comprises a threaded stalk (26) ending inside said end (22) with a support portion (25) in a rigid integral manner.

6. Element according to claim 5, characterized in that said stalk (26) comprises a screw (27) made of a metal material with mechanical features of steel.

7. Element according to claim 1, characterized in that said connecting means (26) are suitable to engage said cavity (16) in a snap-like manner.

8. Element according to claim 1, characterized in that said connecting means (26) are suitable to engage said cavity (16) in a bayonet-like manner.

9. Element according to claim 1, characterized in that said end (22) has a base portion (29) of substantially conical shape, and in that said point (23) is arranged at the vertex end of said base portion.

10. Writing instrument (1), comprising an elongated stem (10) having a grip portion (12) longitudinally delimited by an end portion (14); said stem (10) having a longitudinal cavity (16) of given extension designed to house a writing element (20), in a stable and selectively releasable manner, at the side of said end portion (14),
characterized in that
said writing element (20) has a body (21) delimited by an end (22) provided with a point (23) suitable, in use, to draw signs on paper through oxidation; said body (21) having an elongated coupling portion (24) provided with respective connecting means (26) suitable to engage said cavity (16); characterized in that said end (22) is covered by a cover (28) comprising said point (23) and is made of a composite metal alloy suitable to trace signs on paper through oxidation of the metal alloy.

11. Writing instrument (1) according to claim 10, characterized in that said composite metal alloy is a bi-component metal alloy, wherein a first component of said bi-component metal alloy comprises bismuth and a second component of said bi-component metal alloy comprises tin.

12. Method of production of a writing element (20) for a writing instrument comprising an elongated stem (10) having a grip portion (12) longitudinally delimited by an end portion (14); said stem (10) having a longitudinal cavity (16) of given extension designed to house a writing element (20), in a stable and selectively releasable manner, at the side of said end portion (14),
characterized in that
said writing element (20) has a body (21) delimited by an end (22) provided with a point (23) suitable, in use, to draw signs on paper through oxidation; said body (21) having an elongated coupling portion (24) provided with respective connecting means (26) suitable to engage said cavity (16), wherein said end (22) is covered by a cover (28) comprising said point (23) and is made of a composite metal alloy suitable to trace signs on paper through oxidation of the metal alloy,
the method being characterized by comprising:
a step of providing a bi-component metal alloy, a step of melting a first component of said metal alloy, a step of melting a second component metal of said metal alloy, and a step of pouring the melted alloy into a mold to form the body (21) provided with an end (22) that is made of said metal alloy and is provided with a point (23) suitable to trace signs on paper through oxidation.

13. Method according to claim 12, characterized in that said first metal comprises bismuth and said second metal comprises tin.

14. Method according to claim 13, characterized in that the bismuth concentration is comprised between 60% and 80%, and the tin concentration is comprised between 40% and 20%.

* * * * *